(12) United States Patent
Khoury

(10) Patent No.: US 12,451,953 B2
(45) Date of Patent: Oct. 21, 2025

(54) PERFORMANCE-BASED ADAPTATION OF COMMUNICATION POLARIZATION

(71) Applicant: Ruckus IP Holdings LLC, Claremont, NC (US)

(72) Inventor: Peter G. Khoury, San Francisco, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 133 days.

(21) Appl. No.: 18/353,936

(22) Filed: Jul. 18, 2023

(65) Prior Publication Data

US 2024/0031002 A1 Jan. 25, 2024

Related U.S. Application Data

(60) Provisional application No. 63/390,306, filed on Jul. 19, 2022.

(51) Int. Cl.
*H04B 7/10* (2017.01)
*H04B 7/06* (2006.01)

(52) U.S. Cl.
CPC ............. *H04B 7/10* (2013.01); *H04B 7/0691* (2013.01)

(58) Field of Classification Search
CPC ....... H04B 7/10; H04B 7/0691; H04B 7/0626
See application file for complete search history.

(56) References Cited

U.S. PATENT DOCUMENTS

| 8,761,289 | B2 * | 6/2014 | Erell | H04B 7/0663 |
| | | | | 375/267 |
| 10,057,796 | B2 * | 8/2018 | Elsherbini | H04W 24/08 |
| 2006/0105730 | A1 * | 5/2006 | Modonesi | H04B 7/10 |
| | | | | 455/273 |
| 2009/0207093 | A1 * | 8/2009 | Anreddy | H04B 7/0805 |
| | | | | 343/893 |
| 2016/0233944 | A1 * | 8/2016 | Viswanathan | H01Q 21/245 |
| 2019/0181968 | A1 * | 6/2019 | Vook | H04B 7/0469 |
| 2020/0265285 | A1 * | 8/2020 | Paidimarri | G06K 7/0008 |
| 2021/0336337 | A1 * | 10/2021 | Obeidat | H01Q 19/30 |
| 2024/0298276 | A1 * | 9/2024 | Rai | H04B 7/10 |

OTHER PUBLICATIONS

Machine translation of KR-20100063410 A (Year: 2010).*

* cited by examiner

*Primary Examiner* — Jean B Corrielus
(74) *Attorney, Agent, or Firm* — Steven Stupp

(57) ABSTRACT

During operation, an electronic device may obtain feedback associated with communication performance between the electronic device and a second electronic device, where the feedback includes one or more features including: a channel frequency response, a compressed beamforming report, an error vector magnitude and/or a relationship between at least two of the features. Then, based at least in part on the feedback, the electronic device may dynamically adjust a transmit polarization state and/or a receive polarization state by selecting antennas in a first set of antennas and a second set of antennas in the electronic device, where a given first antenna in the first set of antennas has a first predefined polarization and a given second antenna in the second set of antennas has a second predefined polarization, and the second predefined polarization is different from the first predefined polarization.

20 Claims, 6 Drawing Sheets

PERFORMANCE-BASED ADAPTATION OF COMMUNICATION POLARIZATION

CROSS REFERENCE TO RELATED APPLICATIONS

This application claims priority under 35 U.S.C. 119(e) to U.S. Provisional Application Ser. No. 63/390,306, "Performance-Based Adaptation of Communication Polarization," filed on Jul. 19, 2022, by Peter G. Khoury, the contents of which are herein incorporated by reference.

FIELD

The described embodiments relate to techniques for communication. Notably, the described embodiments relate to techniques for dynamically adjusting the polarization used during transmitting and/or receiving based at least in part on one or more communication performance metrics.

BACKGROUND

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard (which is sometimes referred to as 'Wi-Fi'). For example, a wireless network may include an access point that communicates wirelessly with one or more associated electronic devices (which are sometimes referred to as 'clients').

In order to address effects in a communication environment, during wireless communication one or more transmit antennas having different predefined orthogonal polarizations are often used. (which is sometimes referred to as 'polarization diversity'). For example, separate transmit circuits and transmit antennas with horizontal polarization (or parallel to the ground) and vertical polarization (or perpendicular to the ground) may be used, and the transmit antennas may be spatially offset from each other to ensure that they are decorrelated. In principle, the different predefined polarizations of the spatially decorrelated antennas may help ensure that wireless signals from at least one of the antennas are received by a client at a given location in the communication environment (and, in practice, for N streams of data, wireless signals from at least N antennas that are not heavily faded may be needed).

However, because horizontal and vertical surfaces reflect different polarizations of wireless signals (notably, vertical surfaces preferentially reflect vertical polarization and horizontal surfaces preferentially reflect horizontal polarization), different reflective environments often result in very different fading environments and the polarization of wireless signals at a client can be different from the polarization of the wireless signals as transmitted by the transmit antennas. Moreover, mobile electronic devices can be oriented in very different ways depending on how a user handles a given mobile electronic device (which changes the transmit polarization). Therefore, while polarization diversity can improve the communication performance, the use of a static or predefined polarization (e.g., only using horizontal or vertical polarization) may not be optimal at a given location of a client. Consequently, there is often a communication-performance opportunity cost associated with current polarization-diversity approaches.

SUMMARY

In a first group of embodiments, an electronic device that dynamically adjusts a transmit polarization state and/or a receive polarization state is described. This electronic device includes: a first set of antennas; and a second set of antennas, where a given first antenna in the first set of antennas has a first predefined polarization and a given second antenna in the second set of antennas has a second predefined polarization, and the second predefined polarization is different from the first predefined polarization; and an interface circuit communicatively coupled to the first set of antennas and the second set of antennas. During operation, the electronic device obtains feedback associated with communication performance between the electronic device and a second electronic device, where the feedback includes one or more features including: a channel frequency response, a compressed beamforming report, an error vector magnitude and/or a relationship between at least two of the features. Then, based at least in part on the feedback, the electronic device dynamically adjusts the transmit polarization state and/or the receive polarization state by selecting antennas in the first set of antennas and the second set of antennas.

Moreover, the electronic device may, using the selected antennas, transmit a first packet or a first frame addressed to a third electronic device and/or receive a second packet or a second frame associated with the third electronic device. Note that the second electronic device may be different from the third electronic device.

Furthermore, the first predefined polarization may include a horizontal polarization and the second predefined polarization may include a vertical polarization.

Additionally, the first set of antennas and the second set of antennas may each include an antenna or a pair of antennas.

In some embodiments, the selected antennas may include: one instance of the first predefined polarization and one instance of the second predefined polarization; or two instances of the first predefined polarization and two instances of the second predefined polarization. Note that the selected antennas for the transmit polarization state may be one of two polarization states or one of six polarization states, and the selected antennas for the receive polarization state may be one of four polarization states or one of 16 polarization states.

Moreover, the electronic device may include directors and reflectors, and the electronic device may dynamically adjust antenna patterns of one or more of the antennas in the first set of antennas and the second set of antennas using one or more of the directors and the reflectors. For example, the antenna patterns may be dynamically adjusted based at least in part on one or more of the features.

Furthermore, the transmit polarization state and/or the receive polarization state may be dynamically adjusted based at least in part on a data rate and/or an error rate.

Additionally, the transmit polarization state and/or the receive polarization state may be dynamically adjusted on a per-packet or frame basis or a device-specific basis.

In some embodiments, the selected antennas may be used during communication with a group of electronic devices. Note that the electronic device may aggregate the group of electronic devices based at least in part on the selected antennas. Moreover, the electronic device may communicate, using the selected antennas, with the group of electronic devices using orthogonal frequency division multiple access (OFDMA) and/or multi-user multiple-input multiple-output (MU-MIMO).

Note that the given set of antennas may include separate antennas that are spatially offset from each other.

Another embodiment provides the interface circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a second group of embodiments, an electronic device that dynamically adjusts an antenna pattern is described. This electronic device includes an antenna having a configurable antenna pattern; and an interface circuit communicatively coupled to the antenna. During operation, the electronic device obtains feedback associated with communication performance between the electronic device and a second electronic device, where the feedback includes one or more features including: a channel frequency response, a compressed beamforming report, an error vector magnitude and/or a relationship between at least two of the features. Then, based at least in part on the feedback, the electronic device dynamically adjusts the antenna pattern.

Moreover, the electronic device may, using the antenna pattern, transmit a first packet or a first frame addressed to a third electronic device and/or receive a second packet or a second frame associated with the third electronic device. Note that the second electronic device may be different from the third electronic device.

Furthermore, the electronic device may include directors and reflectors, and the electronic device may dynamically adjust the antenna pattern using one or more of the directors and the reflectors.

Additionally, the antenna pattern may be dynamically adjusted on a per-packet or frame basis or a device-specific basis.

In some embodiments, the antenna pattern may be used during communication with a group of electronic devices. Note that the electronic device may aggregate the group of electronic devices based at least in part on the antenna pattern. Moreover, the electronic device may communicate, using the antenna pattern, with the group of electronic devices using orthogonal frequency division multiple access (OFDMA) and/or multi-user multiple-input multiple-output (MU-MIMO).

Moreover, the feedback may include: a data rate, a packet error, a packet error rate, and/or an error rate.

Another embodiment provides the interface circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a third group of embodiments, an electronic device that dynamically adjusts a number of antennas used during transmitting and/or a transmit polarization state is described. This electronic device includes: a first set of antennas; and a second set of antennas, where a given first antenna in the first set of antennas has a first predefined polarization and a given second antenna in the second set of antennas has a second predefined polarization, and the second predefined polarization is different from the first predefined polarization; and an interface circuit communicatively coupled to the first set of antennas and the second set of antennas. During operation, the electronic device dynamically adjusts, based at least in part on a transmit power and a regulatory constraint: the number of antennas in the first set of antennas and the second set of antennas used during the transmitting; and/or the transmit polarization state by selecting antennas in the first set of antennas and the second set of antennas.

Moreover, the electronic device may transmit, using the number of antennas and/or the selected antennas, a packet or a frame addressed to a second electronic device.

Furthermore, the transmit polarization state may be different from a receive polarization state with selected second antennas in the first set of antennas and the second set of antennas.

Additionally, the dynamically adjusted transmit polarization state may be based at least in part on a modulation and coding scheme. In some embodiments, the dynamically adjusted transmit polarization state may be based at least in part on whether the electronic device uses beamforming to adjust an antenna pattern of a given antenna in the first set of antennas and the second set of antennas.

Moreover, the regulatory constraint may be specified by the Federal Communications Commission (FCC).

Furthermore, the selected antennas may increase a second number of antennas in the first set of antennas and the second set of antennas having the second predefined polarization from an initial balanced arrangement in which a first half of the first set of antennas have the first predefined polarization and a second half of the first set of antennas and the second set of antennas have the second predefined polarization. Note that the second polarization may include a vertical polarization.

Additionally, the first predefined polarization may include a horizontal polarization and the second predefined polarization may include a vertical polarization. Note that the selected antennas may only include the vertical polarization when a transmit power backoff condition specified by the regulatory constraint is reached.

Another embodiment provides the interface circuit.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
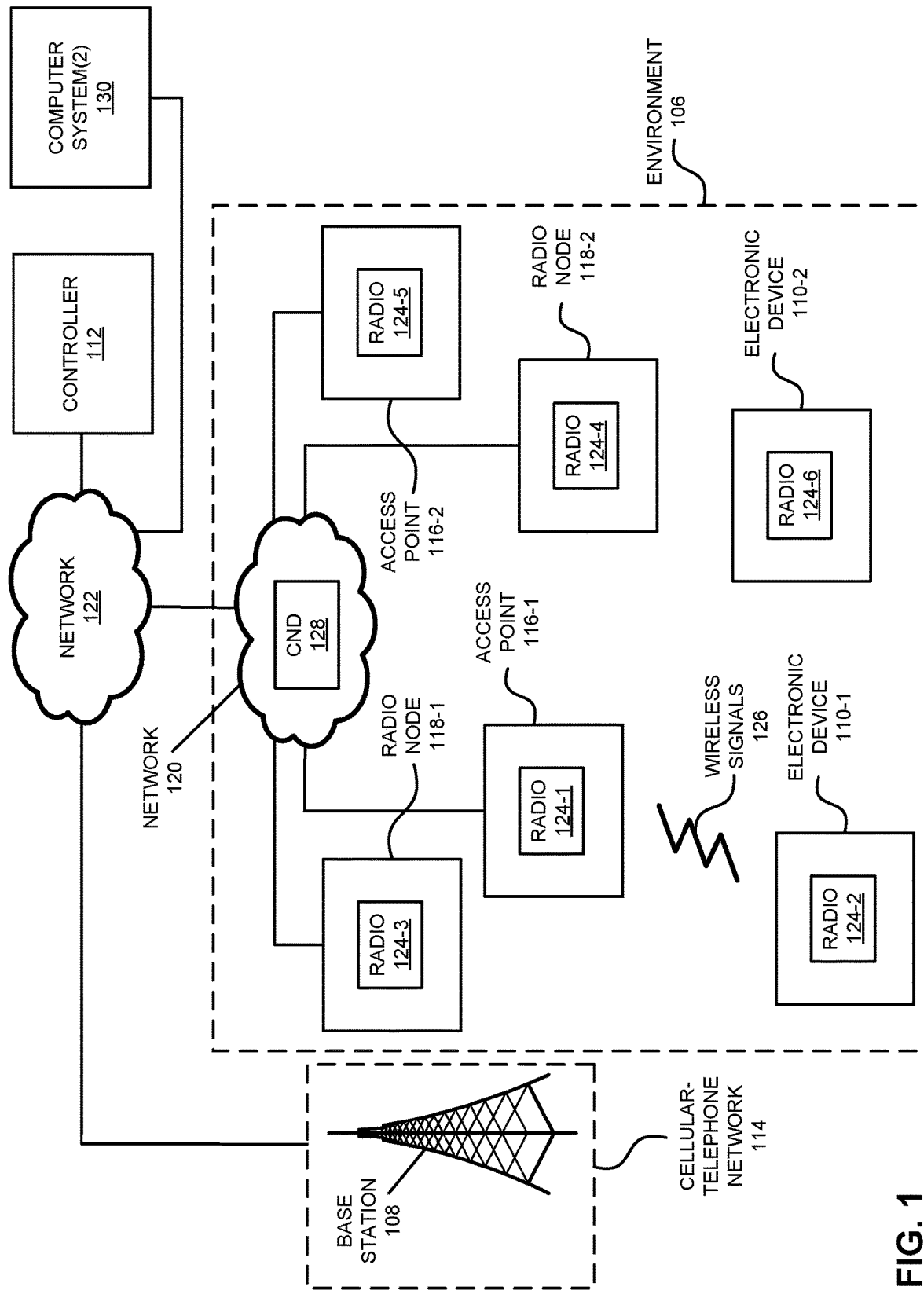
FIG. 1 is a block diagram illustrating an example of communication among electronic devices in accordance with an embodiment of the present disclosure.

In a first group of embodiments, an electronic device that dynamically adjusts a transmit polarization state (or polarizations or orientations of the electric field associated with antennas) and/or a receive polarization state is described. This electronic device may include a first set of antennas and a second set of antennas, where a given first antenna in the first set of antennas has a first predefined polarization and a given second antenna in the second set of antennas has a second predefined polarization, and the second predefined polarization is different from the first predefined polarization. During operation, the electronic device may obtain feedback associated with communication performance between the electronic device and a second electronic device, where the feedback includes one or more features including: a channel frequency response, a compressed beamforming report, an error vector magnitude and/or a relationship between at least two of the features. Then, based at least in part on the feedback, the electronic device may dynamically adjust the transmit polarization state and/or the receive polarization state by selecting antennas in the first set of antennas and the second set of antennas.

By dynamically adjusting the transmit polarization state and/or the receive polarization state, these communication techniques may adapt to a changing wireless communication environment. Notably, the electronic device may reduce or eliminate fading that may occur because of mismatch between the polarization of the wireless signals and polarizations of the first set of antennas and the second set of antennas specified by the receive polarization state. For example, at a given time, the electronic device may be at a spatial location where the first predefined polarization or the second predefined polarization has better communication performance. Moreover, because of regulatory constraints on the transmit polarization state, the communication techniques may allow a different receive polarization state to be used, thereby improving the communication performance (such as throughput, a received signal strength indicator, a signal-to-noise ratio and/or, more generally, a communication-performance metric). Consequently, the communication techniques may improve the user experience when using the electronic device or the second electronic device.

In a second group of embodiments, an electronic device that dynamically adjusts an antenna pattern is described. This electronic device may include an antenna having a configurable antenna pattern. During operation, the electronic device may obtain feedback associated with communication performance between the electronic device and a second electronic device, where the feedback includes one or more features including: a channel frequency response, a compressed beamforming report, an error vector magnitude and/or a relationship between at least two of the features. Then, based at least in part on the feedback, the electronic device may dynamically adjust the antenna pattern.

By using the one or more of the features to dynamically adjust the antenna pattern, the communication techniques may leverage continuous information about the communication performance. This may allow more-robust and/or improved selection of the antenna pattern, and thus may improve the communication performance. Consequently, the communication techniques may improve the user experience when using the electronic device or the second electronic device.

In a third group of embodiments, an electronic device that dynamically adjusts a number of antennas used during transmitting and/or a transmit polarization state is described. This electronic device may include: a first set of antennas; and a second set of antennas, where a given first antenna in the first set of antennas has a first predefined polarization and a given second antenna in the second set of antennas has a second predefined polarization. During operation, the electronic device may dynamically adjust, based at least in part on a transmit power and a regulatory constraint: the number of antennas in the first set of antennas and the second set of antennas used during transmitting; and/or the transmit polarization state by selecting antennas in the first set of antennas and the second set of antennas.

By dynamically adjusting the number of antennas used during the transmitting and/or the transmit polarization state, these communication techniques may adapt to a changing wireless communication environment. Notably, when a transmit power constraint specified by the constraint is reached, the communication techniques may allow a larger transmit power to be used. Moreover, the communication techniques may allow a different receive polarization state to be used when receiving wireless signals than the transmit polarization state using when transmitting the wireless signals. In these ways, the communication techniques may improve the communication performance (such as throughput, a received signal strength indicator, a signal-to-noise ratio and/or, more generally, a communication-performance metric). Consequently, the communication techniques may improve the user experience when using the electronic device or a second electronic device that communicates with the electronic device.

In the discussion that follows, electronic devices or components in a system (such as an access point, a router, a gateway or a network gateway, a radio node, e.g., an eNodeB, or another type of computer network device) communicate frames or packets in accordance with one or more wireless communication protocol, such as an IEEE 802.11 standard (which is sometimes referred to as 'Wi-Fi,' from the Wi-Fi Alliance of Austin, Texas), Bluetooth (from the Bluetooth Special Interest Group of Kirkland, Washington), BLE (from the Bluetooth Special Interest Group of Kirkland, Washington), an IEEE 802.15.4 standard (which is sometimes referred to as Zigbee), Z-Wave (from Sigma Designs, Inc. of Fremont, California), LoRaWAN (from the Lora Alliance of Beaverton, Oregon), Thread (from the Thread Group of San Ramon, California), IPv6 over low-power wireless personal area networks or 6LoWPAN (from the Internet Engineering Taskforce of Fremont, California) a cellular-telephone network or data network communication protocol (such as a third generation or 3G communication protocol, a fourth generation or 4G communication protocol, e.g., Long Term Evolution or LTE or 5GC (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

Moreover, an access point, a radio node, a base station or a switch in the wireless network and/or the cellular-telephone network may communicate with a local or remotely located computer system (such as a controller) using a wired communication protocol, such as a wired communication protocol that is compatible with an IEEE 802.3 standard (which is sometimes referred to as 'Ethernet'), e.g., an Ethernet II standard, Message Queueing Telemetry Transport (MQTT) and/or another type of wired interface. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a macrocell in a cellular-telephone network 114 (which may include a base station 108), one or more access points 116 (which may communicate using Wi-Fi) in a WLAN and/or one or more radio nodes 118 (which may communicate using LTE) in another cellular-telephone network (such as a small-scale network or a small cell). For example, the one or more radio nodes 118 may include: an Evolved Node B (eNodeB), an Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'computer network device.' Moreover, one or more base stations (such as base station 108), access points 116, and/or radio nodes 118 may be included in one or more wireless networks, such as: a WLAN and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or optional controller 112 (which may be a local or a cloud-based controller that manages and/or configures access points 116, radio nodes 118 and/or a computer network device (CND) 128) using a wired communication protocol (such as Ethernet) via network 120 and/or 122. Alternatively, or additionally, access points 116 and/or radio nodes 118 may communicate with optional computer system 130 (which may provide cloud-based storage and/or analytical services, and thus which may include one or more computers at one or more locations) using the wired communication protocol. However, in some embodiments, access points 116 and/or radio nodes 118 may communicate with each other, controller 112 and/or computer system 130 using wireless communication (e.g., one of access points 116 may be a mesh access point in a mesh network). Note that networks 120 and 122 may be the same or different networks. For example, networks 120 and/or 122 may include an LAN, a mesh network, point-to-point connections, an intra-net or the Internet. In some embodiments, network 120 may include one or more routers and/or switches (such as computer network device 128).

Figure 6:
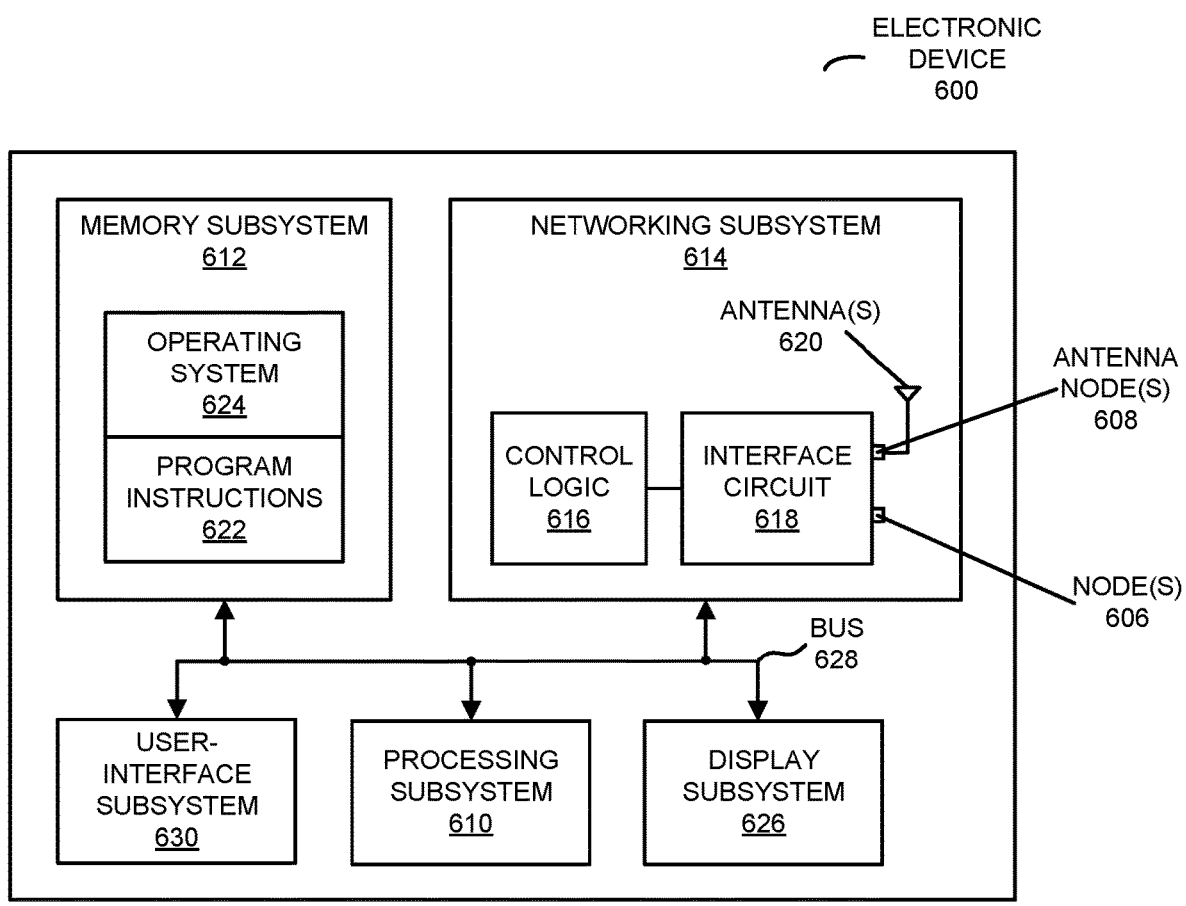
FIG. 6 is a block diagram illustrating an example of an electronic device in accordance with an embodiment of the present disclosure.

As described further below with reference to FIG. 6, electronic devices 110, controller 112, access points 116, radio nodes 118, computer network device 128, and/or computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc. Note that while instances of radios 124 are shown in electronic devices 110, access points 116 and radio nodes 118, one or more of these instances may be different from the other instances of radios 124.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads). In some embodiments, the wireless communication, e.g., by access points 116, may involve the use of dedicated connections, such as via a peer-to-peer (P2P) communication techniques.

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames. Moreover, access point 116-1 may allow electronic device 110-1 to communicate with other electronic devices, computers, computer systems and/or servers via networks 120 and/or 122.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as, but not limited to: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as OFDMA) and/or MIMO communication.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously and as described further below with reference to FIGS. 2-5, one of electronic devices 110, access points 116 or radio nodes 118 may perform at least some aspects of the communication techniques. In the discussion that follows, access point 116-1 is used as an illustrative example.

Because the polarization of a wireless signal may change when the wireless signal is reflected from a surface, the polarization of wireless signals at a client (such as electronic device 110-1) is typically different from the polarization of the wireless signals at the transmit antennas. Moreover, the use of a static or fixed polarizations for transmit antennas and/or receive antennas may not be optimal at a given location of a client. For example, because of reflections, a wireless signal that is transmitted from an antenna with a fixed polarization (such as a vertical or a horizontal polarization) may have a significantly different polarization at the client. If the client device is configured to receive signals having the fixed polarization, then because of the mismatch between the polarization of the receive antenna and the polarization of the wireless signal at the receive antenna, the magnitude of the received signal may be significantly reduced. Furthermore, mobile electronic devices can be oriented in very different ways depending on how a user handles a given mobile electronic device (which changes the transmit polarization), an access point may need to adapt to the changing polarization with electronic-device orientation. Consequently, there may be a communication-performance opportunity cost associated with the use of static or fixed polarizations for antennas.

Moreover, because of regulatory constraints, the transmit power may be constrained depending on a number of transmit antennas and/or a polarization of the transmit antennas. Consequently, the regulatory constraints may, at least in part, dictate the polarization of the transmit antennas. However, when the same and fixed polarization is used for transmitting and receiving, these regulatory constraints may unnecessarily impact the receive polarization and, thus, the communication performance.

In order to address these challenges, in a first group of embodiments access point 116-1 may dynamically adjusts a transmit polarization state and/or a receive polarization state. This capability is sometimes referred to as 'PoleFlex.' Notably, access point 116-1 may include: a first set of antennas and a second set of antennas, where a given first antenna in the first set of antennas has a first predefined polarization and a given second antenna in the second set of antennas has a second predefined polarization. For example, the first predefined polarization may include a horizontal polarization and the second predefined polarization may include a vertical polarization. During operation, access point 116-1 may obtain feedback associated with communication performance between access point 116-1 and a second electronic device (e.g., electronic device 110-1), where the feedback includes one or more features including: a channel frequency response, a compressed beamforming report, an error vector magnitude and/or a relationship (such as a correlation or a statistical association) between at least two of the features. For example, access point 116-1 may obtain the feedback from electronic device 110-1, such as via a packet or a frame (e.g., an acknowledgment). More generally, the features may include: information specifying a throughput, information specifying a received signal strength indicator, information specifying a signal-to-noise ratio and/or information specifying another communication-performance metric. Alternatively or additionally, access point 116-1 may obtain the feedback by computing one or more communication-performance metrics after based at least in part on one or more packets or frames that are received, e.g., from electronic device 110-1.

Then, based at least in part on the feedback, access point 116-1 may dynamically adjust the transmit polarization state and/or the receive polarization state by selecting antennas in the first set of antennas and the second set of antennas. Moreover, access point 116-1 may, using the selected antennas, transmit a first packet or a first frame addressed to a third electronic device and/or receive a second packet or a second frame associated with the third electronic device. Note that the second electronic device may be the same as or different from the third electronic device.

Furthermore, access point 116-1 may include one or more directors and/or one or more reflectors, and access point 116-1 may dynamically adjust antenna patterns of one or more of the antennas in the first set of antennas and the second set of antennas using one or more of the directors and the reflectors. Note that this capability is sometimes referred to as 'BeamFlex.' For example, the antenna patterns may be dynamically adjusted based at least in part on one or more of the features. In some embodiments, the antenna patterns are dynamically adjusted separately from or in addition to the dynamic adjusting of the transmit polarization state and/or the receive polarization state.

Additionally, the transmit polarization state and/or the receive polarization state may be dynamically adjusted based at least in part on a data rate, a packet error, an error rate and/or a packet error rate. In some embodiments, the transmit polarization state and/or the receive polarization state may be dynamically adjusted on a per-packet or frame basis or a device-specific basis. Thus, the transmit polarization state and/or the receive polarization state may be associated with electronic device 110-1. Note that complementary or orthogonal antenna patterns and/or polarization states may be used for different electronic devices 110.

In some embodiments, the selected antennas are used during communication with a group of electronic devices (such as electronic devices 110-1 and 110-2). Note that access point 116-1 may aggregate the group of electronic devices based at least in part on the selected antennas (and, thus, the selected transmit polarization state and/or the selected receive polarization state). Moreover, access point 116-1 may communicate, using the selected antennas, with the group of electronic devices using OFDMA and/or MU-MIMO.

In a third group of embodiments, access point 116-1 may dynamically adjust a number of antennas used during transmitting and/or a transmit polarization state. Notably, access point 116-1 may include: a first set of antennas and a second set of antennas, where a given first antenna in the first set of antennas has a first predefined polarization and a given second antenna in the second set of antennas has a second predefined polarization, and the second predefined polarization is different from the first predefined polarization. For example, the first predefined polarization may include a horizontal polarization and the second predefined polarization may include a vertical polarization. During operation, access point 116-1 may dynamically adjust, based at least in part on a transmit power and a regulatory constraint (e.g., specified by or associated with the FCC or a similar regulatory agency in another country): the number of antennas in the first set of antennas and the second set of antennas used during the transmitting; and/or the transmit polarization state by selecting antennas in the first set of antennas and the second set of antennas. Moreover, the dynamically adjusted transmit polarization state may be based at least in part on a modulation and coding scheme. (Note that the modulation and coding scheme for a given transmission may determine how many spatial data streams are used and the modulation type and coding rate that is used on those streams. The modulation and coding scheme may specify to the number of data bits transmitted per unit of time.) Furthermore, the dynamically adjusted transmit polarization state may be based at least in part on whether access point 116-1 uses beamforming to adjust an antenna pattern of a given antenna in the first set of antennas and the second set of antennas. In some embodiments, access point 116-1 may transmit, using the number of antennas and/or the selected antennas, a packet or a frame addressed to a second electronic device (such as electronic device 110-1). Note that the transmit polarization state may be different from a receive polarization state with selected second antennas in the first set of antennas and the second set of antennas.

For example, the selected antennas may increase a second number of antennas in the first set of antennas and the second set of antennas having the second predefined polarization (such as the vertical polarization) from an initial balanced arrangement in which a first half of the first set of antennas have the first predefined polarization and a second half of the first set of antennas and the second set of antennas have the second predefined polarization. In some embodiments, the selected antennas may need to be changed from all having a polarization (such as a vertical polarization) when a transmit power backoff condition specified by the regulatory constraint is reached.

In the preceding embodiments, note that the given set of antennas may include separate antennas that are spatially offset from each other. Alternatively, one or more antennas may be co-located (i.e., spatially proximate to each other). In some embodiments, the antennas (e.g., for transmit and/or receive) may be single-band or multi-band antennas. For example, the antennas may operate in a 2.4 GHz band of frequencies, a 5 GHz band of frequencies, and/or a 6 GHz band of frequencies. Note that these bands of frequencies are used as an illustration. In general, the communication techniques may be used in a wide variety of bands of frequencies.

In some embodiments, controller 112 is used to configure settings of components in FIG. 1, such as transmit power, a transmit antenna pattern, a receive antenna pattern, a transmit polarization state, a receive polarization state, etc. Moreover, controller 112 may provide information to components in FIG. 1, such as information specifying the regulatory constraint (such as a regulatory constraint associated with the FCC). Thus, controller 112 may provide Wi-Fi control and management planes. Note that controller 112 may be a local device where access points 116 and electronic devices 110 are installed and used, or may be at a remote location (such as a cloud-based implementation).

In these ways, the communication techniques may facilitate dynamic adaptation of the transmit polarization state and/or the receive polarization state. This capability may address dynamic changes in a communication environment. For example, at a given location, a horizontal polarization may have a fading null, while a vertical polarization may not (and, thus, may have a received signal strength that is 10-20 dB larger). By dynamically switching from one or more horizontally polarized antennas to one or more vertically polarized antennas in this circumstance, the communication techniques may significantly improve the communication performance. Moreover, by dynamically adjusting a number of antennas used during the transmitting and/or the transmit polarization state, the communication techniques may allow a higher transmit power to be used and/or a different receive polarization state to be used, which may also significantly improve the communication performance.

Figure 2:
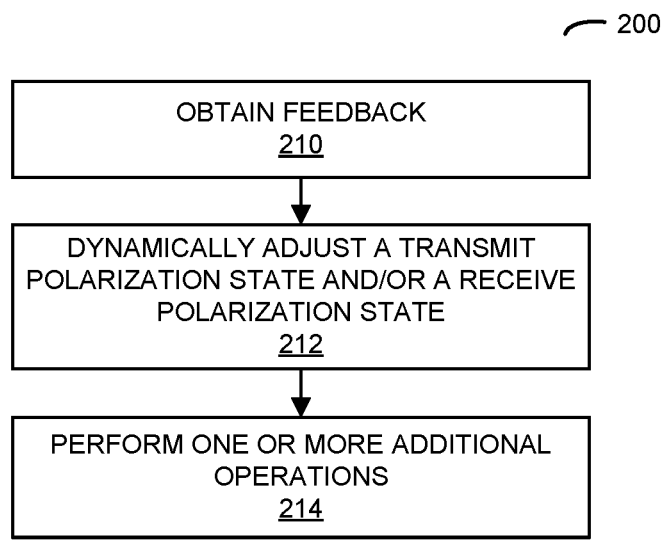
FIG. 2 is a flow diagram illustrating an example of a method for dynamically adjusting a transmit polarization state and/or a receive polarization state in accordance with an embodiment of the present disclosure.

We now describe embodiments of the method in the first group of embodiments. FIG. 2 presents a flow diagram illustrating an example of a method 200 for dynamically adjusting a transmit polarization state and/or a receive polarization state. Moreover, method 200 may be performed by an electronic device, such as one of the one or more access points 116 in FIG. 1, e.g., access point 116-1. During operation, the electronic device may obtain feedback (operation 210) associated with communication performance between the electronic device and a second electronic device, where the feedback includes one or more features including: a channel frequency response, a compressed beamforming report, an error vector magnitude and/or a relationship between at least two of the features. Then, the electronic device may dynamically adjust, based at least in part on the feedback, the transmit polarization state and/or the receive polarization state (operation 212) by selecting antennas in a first set of antennas and a second set of antennas in the electronic device, where a given first antenna in the first set of antennas has a first predefined polarization and a given second antenna in the second set of antennas has a second predefined polarization, and the second predefined polarization is different from the first predefined polarization. Note that the first predefined polarization may include a horizontal polarization and the second predefined polarization may include a vertical polarization.

In some embodiments, the electronic device optionally performs one or more additional operations (operation 214). For example, the electronic device may, using the selected antennas, transmit a first packet or a first frame addressed to a third electronic device and/or receive a second packet or a second frame associated with the third electronic device. Note that the second electronic device may be different from the third electronic device.

Moreover, the electronic device may include directors and reflectors, and the electronic device may dynamically adjust antenna patterns of one or more of the antennas in the first set of antennas and the second set of antennas using one or more of the directors and the reflectors. For example, the antenna patterns may be dynamically adjusted based at least in part on one or more of the features.

Furthermore, the transmit polarization state and/or the receive polarization state may be dynamically adjusted based at least in part on a data rate and/or an error rate.

Additionally, the transmit polarization state and/or the receive polarization state may be dynamically adjusted on a per-packet or frame basis or a device-specific basis.

In some embodiments, the selected antennas may be used during communication with a group of electronic devices. Note that the electronic device may aggregate the group of electronic devices based at least in part on the selected antennas. Moreover, the electronic device may communicate, using the selected antennas, with the group of electronic devices using OFDMA and/or MU-MIMO.

Moreover, the first set of antennas and the second set of antennas may each include an antenna or a pair of antennas. In some embodiments, the selected antennas may include: one instance of the first predefined polarization and one instance of the second predefined polarization; or two instances of the first predefined polarization and two instances of the second predefined polarization. Note that the selected antennas for the transmit polarization state may be one of two polarization states or one of six polarization states, and the selected antennas for the receive polarization state may be one of four polarization states or one of 16 polarization states.

In some embodiments of method 200, there may be additional or fewer operations. Moreover, the order of the operations may be changed, and/or two or more operations may be combined into a single operation.

Figure 3:
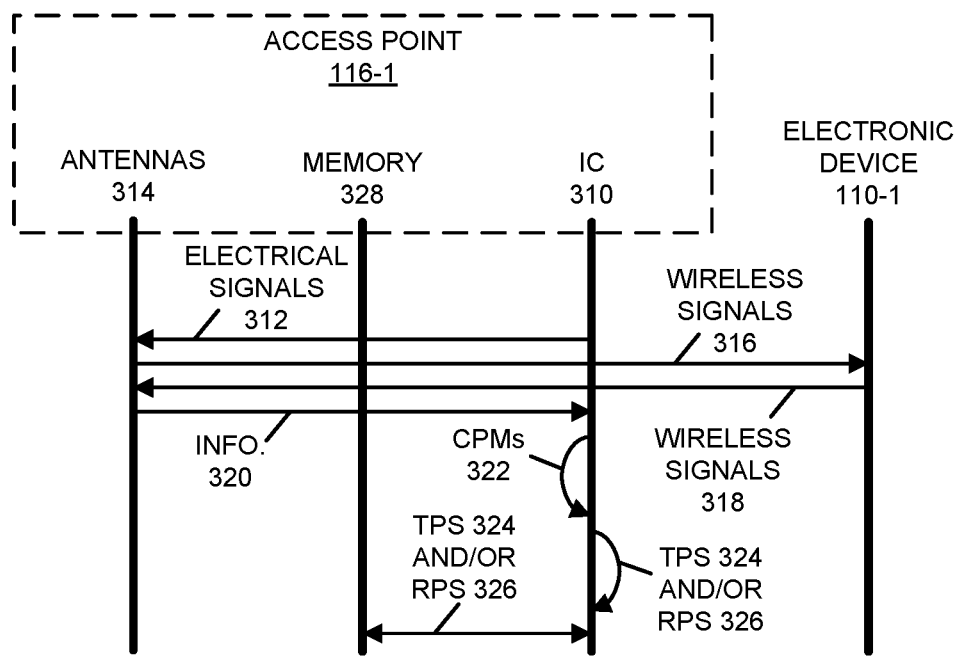
FIG. 3 is a drawing illustrating an example of communication among the electronic devices in FIG. 1 in accordance with an embodiment of the present disclosure.

Embodiments of the communication techniques are further illustrated in FIG. 3, which presents a drawing illustrating an example of communication between electronic device 110-1 and access point 116-1. Notably, interface circuit 310 in access point 116-1 may provide electrical signals 312 corresponding to a packet or a frame to antennas 314 that have polarizations specified by an initial polarization state, where a given antenna has one of a first predefined polarization (such as a horizontal polarization) or a second predefined polarization (such as a vertical polarization), and which transmit corresponding wireless signals 316.

After receiving wireless signals 316, electronic device 110-1 may provide wireless signals 318 corresponding to one or more second packets or frames to access point 116-1. After receiving information 320 conveyed in the one or more second packets or frames (such as an acknowledgment and/or information that specifies a communication-performance metric, such as a received signal strength, a throughput, etc.), interface circuit 310 may compute one or more communication-performance metrics (CPMs) 322 (such as a received signal strength, a throughput, etc.). Note that information 320 and/or the one or more communication-performance metrics 322 may include or may specify feedback about the communication between electronic device 110-1 and access point 116-1, such as one or more features including: a channel frequency response, a compressed beamforming report, an error vector magnitude, and/or a relationship between at least two of the features. In some embodiments, the feedback may include: a data rate, a packet error, a packet error rate, and/or an error rate.

Then, based at least in part on the feedback, interface circuit 310 may dynamically adjust a transmit polarization state (TPS) 324 (such as selected antennas 314 having predefined polarizations for use during transmitting of wireless signals) and/or a receive polarization state (RPS) 326 (such as selected antennas 314 having predefined polarizations for use during receiving of wireless signals). Note that transmit polarization state 324 and/or receive polarization state 326 may be stored in memory 328 in access point 116-1 and may be accessed and subsequently used during communication, e.g., on a per-packet or frame basis or a device-specific basis (such as with electronic device 110-1).

While FIG. 3 illustrates communication between components using unidirectional or bidirectional communication with lines having single arrows or double arrows, in general the communication in a given operation in this figure may involve unidirectional or bidirectional communication.

Some embodiments of the communications techniques may use one or more additional or different features to dynamically adjust a transmit polarization state of first antennas and/or a receive polarization stated of second antennas. Notably, existing BeamFlex and PoleFlex techniques may use packet error as the sole feedback to indicate whether a particular antenna pattern (or antenna radiation pattern) offers superior communication performance. While packet error and the subsequent throughput are closely tied to the communication performance, the feedback in these approaches in all or nothing. Consequently, when a packet transmission fails, the electronic device does not know if the communication failed by a wide or small margin. Moreover, when the packet transmission succeeds again, the electronic device does not know if it succeeded by a wide or narrow margin. Note that, in general, the best rate control may be the one that succeeds with narrow margin, so that the channel is being used in the best possible way.

In the disclosed communication techniques, one or more additional or different features may be used. These features may provide more nuanced feedback than the packet error. Moreover, the features may be used individually, in conjunction with each other and/or in conjunction with the packet error. Note that the features may leverage a symmetric nature of the Wi-Fi channel, where the transmit channel may be the same as the receive channel.

One of the features may be a channel frequency response. Notably, an access point may transmit a packet or a frame (such as a null data packet) and then may characterize (when received) the acknowledgment. For example, the access point may set a particular transmit/receive antenna pattern of an antenna and/or a transmit/receive polarization state (such as by selecting an antenna having a first predefined polarization or a second predefined polarization) and may sound the client (such as electronic device 110-1). Note that the acknowledgment may be a single stream packet and so the characterization returned may include the signal strength or the signal-to-noise ratio of the acknowledgment on each of the receive antennas. Moreover, the characterization may include the phase and amplitude of the signal on each of the sub-carriers on each of the receive antennas. For example, for a four-channel (or chain) access point and a two-channel client, the channel frequency response may characterize up to 2×4× the number of sub-carriers. An advantage of using the channel frequency response is that it is typically fast (e.g., taking 100 μs). However, the channel frequency response may only characterize a single stream. Consequently, the single stream may be corrupted by interference because an undesirable interfering signal may result in an increase of a received signal strength indicator, which would inadvertently be seen as desirable. Alternatively, in some embodiments, the channel frequency response may be extended to multiple streams.

A second feature may be compressed beamforming report or feedback. When the access points sounds for transmit beamforming (such as by sending a null data packet), one or more clients (such as electronic device 110-1 for single-client beamforming or electronic devices 110-1 and 110-2 for multi-user beamforming) may return a compressed beamforming feedback packet that include a transmit matrix. For example, for a four-channel access point and a two-channel client, the compressed beamforming feedback may include information for 2×4× the number of sub-carriers, such as a single-value decomposition of unitary matrices. The one or more clients may also inform the access point of the per stream average signal-to-noise ratio. In the communication techniques, this per-stream signal-to-noise ratio may be used to help choose a transmit antenna pattern, a receive antenna pattern, a transmit polarization state and/or a receive polarization state. For example, the access point may set a particular transmit/receive antenna pattern of an antenna and/or a transmit/receive polarization state (such as by selecting an antenna having a first predefined polarization or a second predefined polarization) and may sound the client (such as electronic device 110-1). An advantage of the compressed beamforming feedback is that it may include information about all the streams. However, the compressed beamforming feedback may consume a lot of airtime because the compressed beamforming feedback is typically a large packet.

A third feature may be an error vector magnitude. Notably, any transmission received from the client may be processed by the access point in baseband. One of the operations in the baseband processing may include training for the various streams on a known symbol sequence. As a byproduct this training, the access point may generate the error vector magnitude, which is the magnitude of the average difference/distance vector between a known training symbol (e.g., in a constellation of symbols) and the actual training symbol received. For example, the error vector magnitude may correspond to a mean-square equalization error relative to an equalization target for each stream of data. The error vector magnitude may be generated for many if not all of the received packets. When the access points sets a particular antenna pattern and/or a polarization state and then triggers an uplink OFDMA packet from a particular client, the error vector magnitude may be used to evaluate the suitability of the antenna pattern and/or the polarization state for transmission and reception. An advantage of the error vector magnitude is that it is a per-stream metric and there is not a cost in obtaining or determining it (other than triggering the uplink OFDMA packets). However, the error vector magnitude may be noisier than the channel frequency response or the compressed beamforming feedback. In some embodiments, the noise may be reduced by averaging the error vector magnitude for multiple packets (such as 10-1,000 packets).

In some embodiments, the compressed beamforming feedback is communicated in a transmit sounding frame. Moreover, the compressed beamforming feedback may be used to refine an initial transmit or receive polarization state that was selected based at least in part on the channel frequency response. Furthermore, there may be a correlation or a statistical association between the compressed beamforming feedback or the packet error and the error vector magnitude.

Figure 4:
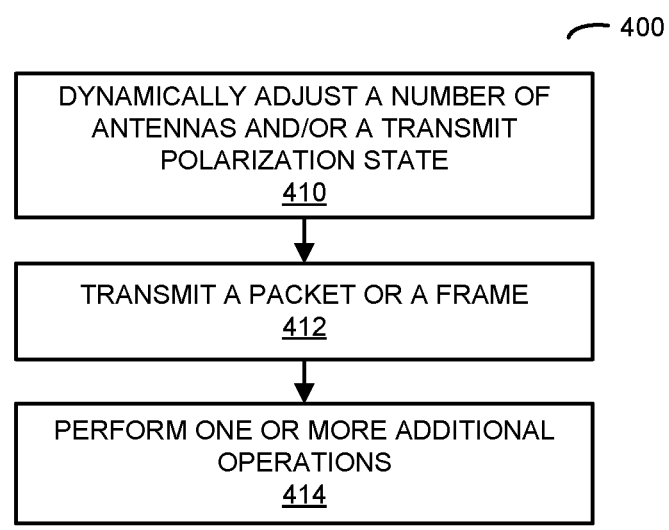
FIG. 4 is a flow diagram illustrating an example of a method for dynamically adjusting a number of antennas used during transmitting and/or a transmit polarization state in accordance with an embodiment of the present disclosure.

We now describe embodiments of the method in the third group of embodiments. FIG. 4 presents a flow diagram illustrating an example of a method 400 for dynamically adjusting a number of antennas used during transmitting and/or a transmit polarization state. Moreover, method 400 may be performed by an electronic device, such as one of the one or more access points 116 in FIG. 1, e.g., access point 116-1. During operation, the electronic device may dynamically adjust, based at least in part on a transmit power and a regulatory constraint: the number of antennas (operation 410) in a first set of antennas and a second set of antennas in the electronic device used during the transmitting; and/or the transmit polarization state (operation 410) by selecting antennas in a first set of antennas and a second set of antennas in the electronic device, where a given first antenna in the first set of antennas has a first predefined polarization and a given second antenna in the second set of antennas has a second predefined polarization, and the second predefined polarization is different from the first predefined polarization. Moreover, the electronic device may transmit, using the number of antennas and/or the selected antennas, a packet or a frame (operation 412) addressed to a second electronic device.

Furthermore, the transmit polarization state may be different from a receive polarization state with selected second antennas in the first set of antennas and the second set of antennas.

Additionally, the dynamically adjusted transmit polarization state may be based at least in part on a modulation and coding scheme. In some embodiments, the dynamically adjusted transmit polarization state may be based at least in part on whether the electronic device uses beamforming to adjust an antenna pattern of a given antenna in the first set of antennas and the second set of antennas.

Note that the regulatory constraint may be specified by the FCC.

Moreover, the selected antennas may increase a second number of antennas in the first set of antennas and the second set of antennas having the second predefined polarization (such as a vertical polarization) from an initial balanced arrangement in which a first half of the first set of antennas have the first predefined polarization and a second half of the first set of antennas and the second set of antennas have the second predefined polarization.

Furthermore, the first predefined polarization may include a horizontal polarization and the second predefined polarization may include a vertical polarization, and the selected antennas may only include the vertical polarization when a transmit power backoff condition specified by the regulatory constraint is reached.

In some embodiments of method 600, there may be additional or fewer operations. Moreover, the order of the operations may be changed, and/or two or more operations may be combined into a single operation.

Embodiments of the communication techniques are further illustrated in FIG. which presents a drawing illustrating an example of communication between electronic device 110-1 and access point 116-1. Notably, based at least in part on a regulatory constraint 510 (which may be access in memory 512 in access point 116-1) and a transmit power, interface circuit 514 in access point 116-1 may dynamically adjust a number of antennas (NOA) 516 in antennas 518 using during transmitting and/or a transmit polarization state (TPS) 520 (such as antennas 518 having predefined polarizations for use during transmitting of wireless signals). The number of antennas 516 and/or transmit polarization state 520 may be stored in memory 512 and may be accessed and subsequently used during transmitting, e.g., on a per-packet or frame basis or a device-specific basis (such as with electronic device 110-1). For example, during the transmitting, interface circuit 514 may provide electrical signals 522 corresponding to a packet or a frame to antennas 518 that have the selected transmit polarization state 520, which transmit corresponding wireless signals 524 to electronic device 110-1.

Figure 5:
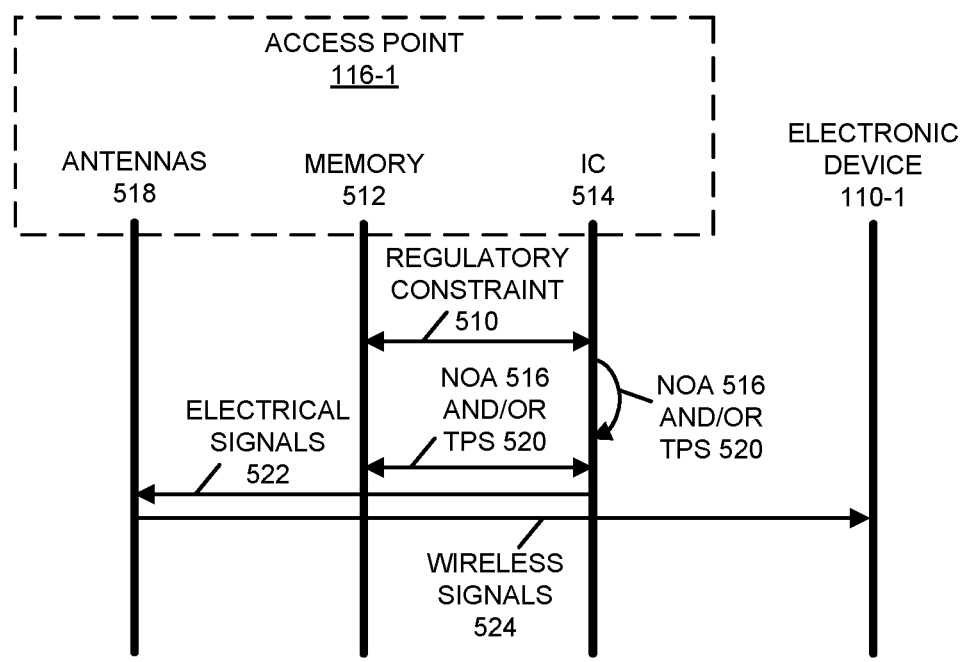
FIG. 5 is a drawing illustrating an example of communication between electronic devices in FIG. 1 in accordance with an embodiment of the present disclosure.

While FIG. 5 illustrates communication between components using unidirectional or bidirectional communication with lines having single arrows or double arrows, in general the communication in a given operation in this figure may involve unidirectional or bidirectional communication.

Some embodiments of the communication techniques may provide additional degrees of freedom to address/comply with a regulatory requirement and to improve communication performance. Notably, because of FCC rules, most access points with fixed antennas have an evenly balanced number of horizontally (H) and vertically (V) polarized antennas. However, this even balance only matters for transmit, not receive. Consequently, in the communication techniques, a different mixture of horizontally and vertically polarized antennas may be used when receiving a wireless signal than when transmitting a wireless signal.

Moreover, as part of its regulatory framework, the FCC has imposed limits on transmit power. The regulations are more complicated when more than one antenna is involved in a transmission. Notably, the FCC rules state that, if a group of antennas are identically polarized all horizontally or all vertically, then the transmit power of an access point typically needs to be decreased by the combined gain of the antennas. For example, when a non-beamformed transmission occurs on two horizontally polarized antennas, these two antennas create, on average, a combined 3 dB power boost. Therefore, the transmit power of each of the antennas usually needs to be decreased by 3 dB to remain under the transmit limit. Alternatively, when two horizontally polarized antennas are involved in a beamformed transmission, the transmitted signal from the antennas may combine for 6 dB of gain. Therefore, the transmit power of each of the antenna typically needs to be decreased by 6 dB.

As noted previously, horizontally polarized signals typically fade very differently from vertically polarized signals. Additionally, a receive antenna of a client (such as electronic device 110-1) may be oriented horizontally and may couple better with the horizontally polarized antenna(s) of an access point, or may be oriented vertically and may couple better with the vertically polarized antenna(s) of the access point. This problem often occurs with cellular telephones, because a user can change the orientation of a cellular telephone at will, thereby can change the physical direction of the antenna in the cellular telephone.

The resulting large changes in fading and coupling between horizontal and vertically polarized antennas provides significant room for exploitation. Notably, by choosing the less-faded better-coupled antenna, the communication techniques may allow an access point to significantly boost the signal-to-noise ratio of the transmitted and/or the received wireless signal. This PoleFlex capability may allow an access point to choose the best mix of horizontally polarized and vertically polarized antennas that couple best to the client. Because a Wi-Fi channel is symmetric, a good receive channel will also be a good transmit channel. Combining these facts, note that the best physical radio-frequency coupling may involve setting all of the antennas to vertically polarized. However, doing so may incur the FCC penalty for transmission, but not for reception. Moreover, combining the gain of all the vertically polarized antennas may not make up for the FCC penalty. When this is the case, then the best polarization state for transmission will be different from the best polarization state for reception.

For example, consider an access point with two chains or transmit channels. On each of the chains, the access point may be able to transmit using either a horizontally polarized antenna or a vertically polarized antenna. Consequently, there may be four possible transmit groups: HH, HV, VH, VV. When the best channel coupling to a client is VV, this will be the best polarization state or antenna pattern group to use for reception of a packet. However, the 3 or 6 dB penalty for this polarization state may mean that this is not the best for transmission. Instead, the access point may use HV or VH for the transmit polarization state. Therefore, typically when choosing among the possible transmit polarization states or antenna pattern groups for transmission, the access point may only choose from HV or VH, while for reception the access point may chose from HH, HV, VH, or VV. This approach may also be used for an access point with four chains, where there are six polarization states or antenna pattern groups that have two horizontally polarized and two vertically polarized antennas (HVVH, HHVV, VVHH, VHHV, HVHV and VHVH) and 16 possible polarization states or antenna pattern groups for reception. Thus, the search for the transmit polarization state or antenna pattern group may be in a smaller space and faster than the search for the receive polarization states or antenna pattern group. Note that because of the FCC rules, the access point may use transmit or receive communication-performance metrics and polarization states or antenna pattern groups that do not have the best coupling with a client.

For example, when a transmit power backoff condition specified by the regulatory constraint is reached, the number of antennas used during transmitting may be reduced. Moreover, for modulation and coding scheme level 0, two horizontally polarized and two vertically polarized antennas may be used for transmitting, and four vertically polarized antennas may be used for receiving. As the modulation and coding scheme level is increased, the transmit power backoff may be −3 dB (or a higher penalty when beamforming is used). Alternatively, as the modulation and coding scheme level is increased, one of the two horizontally polarized antennas could be replaced with a third vertically polarized antenna. For a modulation and coding scheme level of 12 or 12, four vertically polarized antennas may be used for transmitting.

Note that the preceding embodiments may include fewer or additional components, two or more components may be combined into a single component, and/or positions of one or more components may be changed.

Moreover, in the preceding embodiments, note that a transceiver or a transmit or a receive chain may be selectively coupled to different antennas having different predefined polarizations using a switch.

In general, using the communication techniques, an electronic device may select antennas having multiple possible polarizations, such as: horizontal, vertical, slant linear, circular or elliptical polarizations. (Moreover, at least some of the antennas may have adjustable or configurable antenna patterns, e.g., using one or more reflectors and/or one or more directors, or different predefined antenna patterns, such as an omnidirectional antenna pattern.) This capability may help with wireless paths that have a reduced signal. Notably, propagation (such as indoors) may degrade with the first 'bounce' or reflection. Moreover, the polarization of the wireless signals may change on reflection. Consequently, there is no way to know which polarization is dominant in a communication environment.

The communication techniques may address this problem by allowing the transmit polarization state of antennas and/or the receive polarization state of antennas to be dynamically adjusted. This capability may allow effects such as interference, cross-polarization loss and/or fading to be reduced or eliminated. Moreover, in contrast with the use of a circular polarized receive antenna to receive a linearly polarized wireless signal, the communication techniques may not suffer from a 3 dB loss.

In some embodiments, when fast fading occurs, it may not be possible for the electronic device to dynamically adjust the polarization of the antennas. Consequently, in these embodiments, the electronic device may use both a vertical polarized antenna and a horizontally polarized antenna. The resulting wireless signals may have a +45° polarization or a −45° polarization, which may reduce the impact of the fast fading. In these embodiments, note that the communication techniques may not increase the gain of the antenna radiation pattern. Instead, the communication techniques may reduce or eliminate the effect of a fading null at one polarization and/or a change in the polarization because of reflections.

In some embodiments, a given antenna may be or may include a monopole or a dipole (such as a bent dipole antenna) or a slot antenna. For example, a dipole antenna may have a horizontal polarization and a slot antenna may have a vertical polarization. However, a wide variety of types of antennas and/or antenna elements may be used. The antennas may be free-standing and/or may be implemented on a substrate or a printed-circuit board (e.g., FR4, Rogers 4003, or another dielectric material), such as by using metal or another radio-frequency conducting foil on one side of the substrate and a ground plane on the other (coplanar) side of the substrate. As discussed further below, one or more additional components may be optionally included on either or both sides of the substrate. Note that the given antenna may have a polarization substantially in a plane of the substrate.

Moreover, in some embodiments, in addition to dynamically adjusting the polarization of the transmitted or the received wireless signals, an electronic device that implements the communication techniques may dynamically change an antenna pattern or an antenna radiation pattern of the one or more of the antennas, so that the antenna radiation pattern varies or can be changed between an omnidirectional radiation pattern and a directional radiation pattern (which has gain in a particular direction relative to an omnidirectional radiation pattern, e.g., a cardioid directional radiation pattern).

For example, the given antenna may optionally include one or more antenna elements, such a dipole (e.g., a bent dipole). In some embodiments, these antenna elements are implemented on a substrate. Moreover, an electronic device may include an antenna element selector (such as a radio-frequency switch, e.g., a single-pole, single-throw switch) that selectively couples a transceiver (or an associated radio-frequency feed port) to one or more of the antenna elements. Furthermore, the given antenna may optionally include one or more passive components, such as one or more directors and/or one or more reflectors. Thus, the given antenna may include a Yagi-uda antenna.

Note that a director may be tuned to a slightly higher frequency than a given antenna element, may be electrically decoupled from the given antenna element, and may be selectively coupled to the ground plane via a PIN diode, a GaAs FET, a MEMS switch, or another radio-frequency switch. When a control signal from an interface circuit forward biases the PIN diode, the director may be coupled to ground and the director may not modify the radiation pattern of the given antenna element appreciably. Alternatively, when the control signal reverse biases the PIN diode, the director may be decoupled from ground and may re-radiate the wireless signals from the given antenna element, which may make the antenna radiation pattern more directional. For example, a director may provide 1-2 dB of gain for the given antenna element.

Additionally, note that a reflector may be tuned to a slightly lower frequency than the given antenna element, may be electrically decoupled from the given antenna element, and may be selectively coupled to the ground plane via a PIN diode or a radio-frequency switch. When the PIN diode is forward biased, the reflector may be coupled to ground and the director may reflect the wireless signals from the given antenna element, thereby making the antenna radiation pattern more directional. Alternatively, when the PIN diode is reversed biased, the reflector may be decoupled from ground and may not modify the radiation pattern of the given antenna element appreciably. Thus, by selecting particular antenna element(s) and selectively activating (or deactivating) the one or more directors and/or one or more reflectors, the antenna radiation pattern of a given antenna may be varied from directional to omnidirectional.

Note that dimensions of the individual components in the given antenna may be established by use of radio-frequency simulation software, such as IE3D from Zeland Software of Fremont, California. In some embodiments, the given antenna may include one or more additional components, such as passive components that implement phase or impedance matching, that change a resonance frequency, that broaden the frequency response (or bandwidth), etc. For example, in the 2.4 to 2.4835 GHz band of frequencies, the frequency response of a dipole may be between 300-500 MHz.

Moreover, switching at radio frequency (as opposed to baseband) may allow the electronic device to have fewer up/down converters and may simplify impedance matching between the interface circuit and the antennas. For example, a given antenna may provide an impedance match under all configurations of selected antenna elements, regardless of which antenna elements are selected. In some embodiments, a match with less than 10 dB return loss may be maintained under all configurations of selected antenna elements, over the range of frequencies (such as a band of frequencies in an IEEE 802.11 standard), regardless of which antenna elements are selected.

Alternatively or additionally to using antenna elements to vary the antenna radiation pattern, in some embodiments the communication techniques may be used in conjunction with beamforming. Note that the changes in the antenna radiation pattern and/or the beamforming may be used during transmission and/or receiving.

We now describe embodiments of an electronic device, which may perform at least some of the operations in the communication techniques. FIG. 6 presents a block diagram illustrating an example of an electronic device 600 in accordance with some embodiments, such as one of: base station 108, one of electronic devices 110, controller 112, one of access points 116, one of radio nodes 118, computer network device 128, or computer system 130. This electronic device includes processing subsystem 610, memory subsystem 612, and networking subsystem 614. Processing subsystem 610 includes one or more devices configured to perform computational operations. For example, processing subsystem 610 can include one or more microprocessors, graphics processing units (GPUs), ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include DRAM, static random access memory (SRAM), and/or other types of memory. In some embodiments, instructions for processing subsystem 610 in memory subsystem 612 include: one or more program modules or sets of instructions (such as program instructions 622 or operating system 624, such as Linux, UNIX, Windows Server, or another customized and proprietary operating system), which may be executed by processing subsystem 610. Note that the one or more computer programs, program modules or instructions may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as antenna nodes 608, e.g., a metal pad or a connector, which can be coupled to the one or more antennas 620, or nodes 606, which can be coupled to a wired or optical connection or link. Thus, electronic device 600 may or may not include the one or more antennas 620. Note that the one or more nodes 606 and/or antenna nodes 608 may constitute input(s) to and/or output(s) from electronic device 600.) For example, networking subsystem 614 can include a Bluetooth networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, a Zigbee networking system, a Z-Wave networking system, a LoRaWAN networking system and/or another networking system.

Note that a transmit or receive antenna pattern (or antenna radiation pattern) of electronic device 600 may be adapted or changed using pattern shapers (such as directors or reflectors) and/or one or more antennas 620 (or antenna elements), which can be independently and selectively electrically coupled to ground to steer the transmit antenna pattern in different directions. Thus, if one or more antennas 620 include N antenna pattern shapers, the one or more antennas may have 2 N different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Moreover, electronic device 600 may include a user-interface subsystem 630, such as: a mouse, a keyboard, a trackpad, a stylus, a voice-recognition interface, and/or another human-machine interface. In some embodiments, user-interface subsystem 630 may include or may interact with a touch-sensitive display in display subsystem 626.

Electronic device 600 can be (or can be included in) any electronic device with at least one network interface. For example, electronic device 600 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 and/or of electronic device 600. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively, or additionally, at least some of the operations in the communication techniques may be implemented in a physical layer, such as hardware in interface circuit 618.

Furthermore, the functionality of electronic device 600 may be implemented using a single electronic device or a group of electronic devices, which may be located at a single location or which may be distributed at disparate geographic locations (such as a cloud-based computing system).

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a first set of antennas;
   a second set of antennas, where a given first antenna in the first set of antennas has a first predefined polarization and a given second antenna in the second set of antennas has a second predefined polarization, and the second predefined polarization is different from the first predefined polarization; and
   an interface circuit communicatively coupled to the first set of antennas and the second set of antennas, wherein the electronic device is configured to:
      obtain feedback associated with communication performance between the electronic device and a second electronic device, wherein the feedback comprises one or more features comprising: a channel frequency response, a compressed beamforming report, an error vector magnitude, or a relationship between at least two of the features; and
      dynamically adjust, based at least in part on the feedback, a transmit polarization state, a receive polarization state, or both, by selecting antennas in the first set of antennas and the second set of antennas, wherein the transmit polarization state, the receive polarization state, or both, is dynamically adjusted on a per-packet or frame basis or a device-specific basis.

2. The electronic device of claim 1, wherein the electronic device is configured to, using the selected antennas, transmit a first packet or a first frame addressed to a third electronic device, receive a second packet or a second frame associated with the third electronic device, or both.

3. The electronic device of claim 2, wherein the second electronic device is different from the third electronic device.

4. The electronic device of claim 1, wherein the first predefined polarization comprises a horizontal polarization and the second predefined polarization comprises a vertical polarization.

5. The electronic device of claim 1, wherein the first set of antennas and the second set of antennas each comprise an antenna or a pair of antennas; and
   wherein the selected antennas comprises: one instance of the first predefined polarization and one instance of the second predefined polarization; or two instances of the first predefined polarization and two instances of the second predefined polarization.

6. The electronic device of claim 1, wherein the selected antennas for the transmit polarization state comprises one of two polarization states or one of six polarization states, and the selected antennas for the receive polarization state comprises one of four polarization states or one of 16 polarization states.

7. The electronic device of claim 1, wherein the electronic device comprises directors and reflectors, and the electronic device is configured to dynamically adjust antenna patterns of one or more of the antennas in the first set of antennas and the second set of antennas using one or more of the directors and the reflectors.

8. The electronic device of claim 1, wherein the transmit polarization state, the receive polarization state, or both, is dynamically adjusted based at least in part on one or more of a data rate, a packet error or an error rate.

9. The electronic device of claim 1, wherein the electronic device is configured to communicate with a group of electronic devices using the selected antennas.

10. The electronic device of claim 9, wherein the electronic device is configured to aggregate the group of electronic devices based at least in part on the selected antennas.

11. The electronic device of claim 1, wherein the electronic device is configured to communicate, using the selected antennas, with a group of electronic devices using orthogonal frequency division multiple access (OFDMA) or multi-user multiple-input multiple-output (MU-MIMO).

12. The electronic device of claim 1, wherein the given set of antennas comprises separate antennas that are spatially offset from each other.

13. A non-transitory computer-readable storage medium for use in conjunction with an electronic device, the computer-readable storage medium storing program instructions that, when executed by the electronic device, cause the electronic device to perform operations comprising:
   obtaining feedback associated with communication performance between the electronic device and a second electronic device, wherein the feedback comprises one or more features comprising: a channel frequency response, a compressed beamforming report, an error vector magnitude, or a relationship between at least two of the features; and
   dynamically adjusting, based at least in part on the feedback, a transmit polarization state, a receive polarization state, or both, by selecting antennas in a first set of antennas and a second set of antennas in the electronic device, where a given first antenna in the first set of antennas has a first predefined polarization and a given second antenna in the second set of antennas has a second predefined polarization, and the second predefined polarization is different from the first predefined polarization, wherein the transmit polarization state, the receive polarization state, or both, is dynamically adjusted on a per-packet or frame basis or a device-specific basis.

14. The non-transitory computer-readable storage medium of claim 13, wherein the operations comprise, using the selected antennas, transmitting a first packet or a first frame addressed to a third electronic device, receiving a second packet or a second frame associated with the third electronic device, or both.

15. The non-transitory computer-readable storage medium of claim 13, wherein the operations comprise:
   aggregating a group of electronic devices based at least in part on the selected antennas; and
   communicating with the group of electronic devices using the selected antennas.

16. A method for dynamically adjusting a transmit polarization state, a receive polarization state, or both, comprising:
   by an electronic device:
      obtaining feedback associated with communication performance between the electronic device and a second electronic device, wherein the feedback comprises one or more features comprising: a channel frequency response, a compressed beamforming report, an error vector magnitude, or a relationship between at least two of the features; and dynamically adjusting, based at least in part on the feedback, the transmit polarization state, the receive polarization state, or both, by selecting antennas in a first set of antennas and a second set of antennas in the electronic device, where a given first antenna in the first set of antennas has a first predefined polarization and a given second antenna in the second set of antennas has a second predefined polarization, and the second predefined polarization is different from the first predefined polarization, wherein the transmit polarization state, the receive polarization state, or both, is dynamically adjusted on a per-packet or frame basis or a device-specific basis.

17. The method of claim 16, wherein the method comprises, using the selected antennas, transmitting a first packet or a first frame addressed to a third electronic device, receiving a second packet or a second frame associated with the third electronic device, or both.

18. The method of claim 16, wherein the method comprises:
aggregating a group of electronic devices based at least in part on the selected antennas; and
communicating with the group of electronic devices using the selected antennas.

19. The method of claim 16, wherein the method comprises communicating, using the selected antennas, with a group of electronic devices using orthogonal frequency division multiple access (OFDMA) or multi-user multiple-input multiple-output (MU-MIMO).

20. The method of claim 16, wherein the method comprises:
communicating with a group of electronic devices using the selected antennas; and
aggregating the group of electronic devices based at least in part on the selected antennas.

* * * * *